June 24, 1930. A. H. ROOS 1,766,546
COMBINATION CALIPERS
Filed Nov. 13, 1928
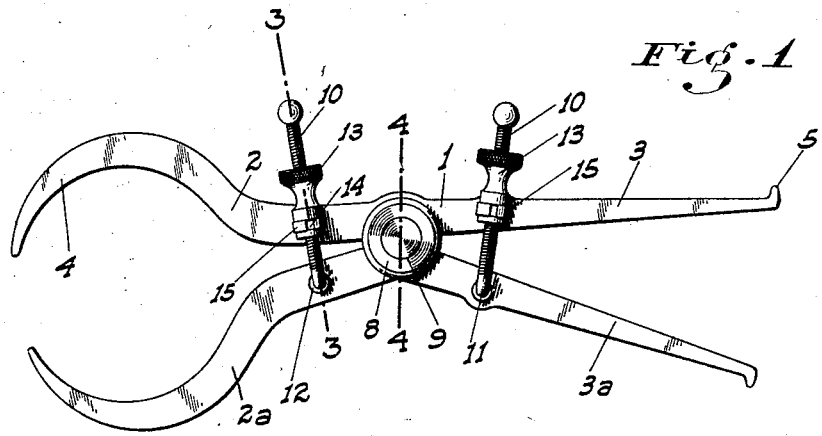
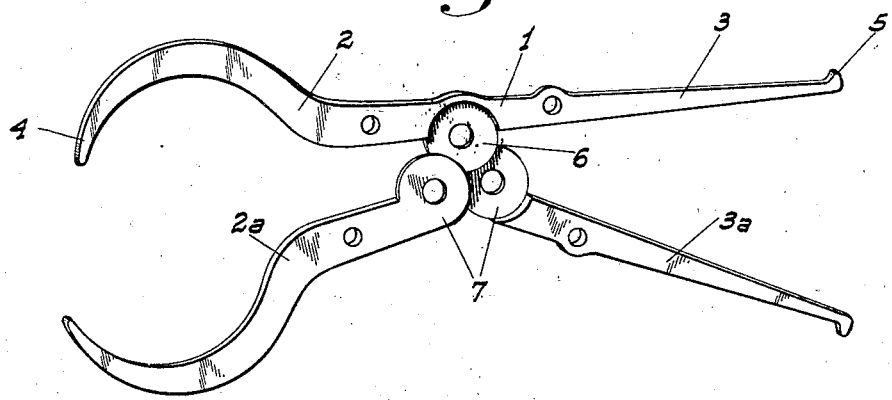
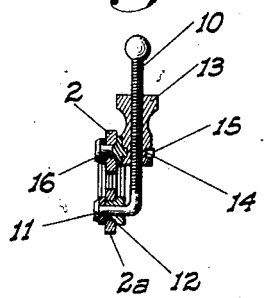
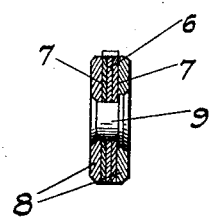
INVENTOR
*A. H. Roos*
BY
ATTORNEY Patented June 24, 1930

1,766,546

UNITED STATES PATENT OFFICE

AXEL H. ROOS, OF CHICO, CALIFORNIA

COMBINATION CALIPERS

Application filed November 13, 1928. Serial No. 319,078.

This invention relates to calipers such as are used by machinists and others in gaging the external and internal diameters of various parts.

The principal object of my invention is to provide in the form of a single unitary tool, both inside and outside measuring arms and means for independently adjusting the setting of both pairs of arms, so that said arms may be used either in conjunction with each other, or independently as may be desired.

My improved combination calipers therefore provides a very convenient tool of its kind.

A further object of the invention is to provide positive adjusting means for the arms so that accuracy of setting of the arms may be had and maintained and without the use of any springs.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views:

Fig. 1 is a side elevation of my improved calipers.

Fig. 2 is a perspective view of the arm members partly disassociated from each other but retaining their relative lateral positions with respect to each other.

Fig. 3 is an enlarged cross section on the line 3—3 of Fig. 1 showing the mounting of the adjustment means.

Fig. 4 is an enlarged cross section through the hub of the tool taken on the line 4—4 of Fig. 1.

Referring now more particularly to the characters of reference on the drawings, the tool comprises a rigid member 1 which forms two arms 2 and 3, the arm 2 being formed at its outer end with the usual bend 4, common to outside measuring calipers, while the arm 3 at its outer end has an outwardly projecting lug 5, such as is common to inside measuring calipers. The member 1 is formed with a hub 6 at the junction of the arms which project inwardly somewhat from one side edge of said member.

Other and independent arms $2^a$ and $3^a$ corresponding in shape and size to the arms 2 and 3 have hubs 7 to cooperate and register with the hub 6 on opposite sides thereof. All these hubs are cut down in thickness so that when the three of them are placed together in closely abutting relationship, the total thickness will be that of each arm, with the hub of the member 1 in the center and the hubs of the others disposed in oppositely offset relation so that the opposed pairs of arms lie in a common plane. The relatively thin metal of the hubs is braced and reinforced by heavy circular washers 8 placed against the outermost hub members, a pivotal rivet 9 being passed through all the hubs and secured to the washers as shown in Fig. 4.

By means of this construction it will be seen that while the arms 2 and 3 are rigid and can not move relative to each other, the arms $2^a$ and $3^a$ can move independently of each other and to and from the corresponding arms 2 and 3, turning of course on the pivot 9 so that independent inside and outside measurements can be readily calipered.

Independent means for each pair of arms for positively moving the same to and from each other is provided as follows:

Projecting across the sides faces of the arms a short distance from the hubs is a screw pin 10 having on one end a right angle bend 11 which is turnably mounted in a sleeve 12 fixed in and extending across the corresponding arm, so as to provide a wider bearing for the bend portion of the pin than could be had by relying on the relatively thin arm alone. A single adjustment nut 13 is threaded on the pin, said nut having a circumferential groove 14 adjacent its inner end which is closely engaged by a yoke 15. This yoke is formed with a trunnion 16 projecting through and turnably fixed in the other arm. The sleeve 12 and the trunnion 16 are the same distance from the center of the hub so that the pin 10 will always be disposed in a plane at right angles to a line drawn through the hub and intersecting the angle between the arms.

By means of this arrangement it will be seen that turning of the nut in either direction positively moves the corresponding arm to and from the relatively fixed arms without the use of any springs being necessary. As shown there is one such adjusting screw unit for each pair of arms so that they may be adjusted separate from each other.

Also if desired, in order to make a cheaper tool, the adjusting screw units may be omitted and the arms merely held together by a tight fit at the hubs, as is commonly the case with ordinary calipers.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A combination calipers comprising a rigid member shaped at its opposite ends for inside and outside measuring purposes respectively, arms separate from each other and from said member shaped to correspond to and cooperate with the different end portions of said member, a common pivotal connection between said arms at their adjacent ends and said member intermediate its ends arranged to permit of movement of either arm independent of the other arm and said member, means between one arm and said member for adjusting the spacing between the corresponding outer ends of the same, and independent means between the other arm and said member for independently adjusting the setting of the corresponding outer ends of the same.

In testimony whereof I affix my signature.

AXEL H. ROOS.